W. E. REID.
HAND CULTIVATOR.
APPLICATION FILED JULY 27, 1917.
1,248,914.
Patented Dec. 4, 1917.
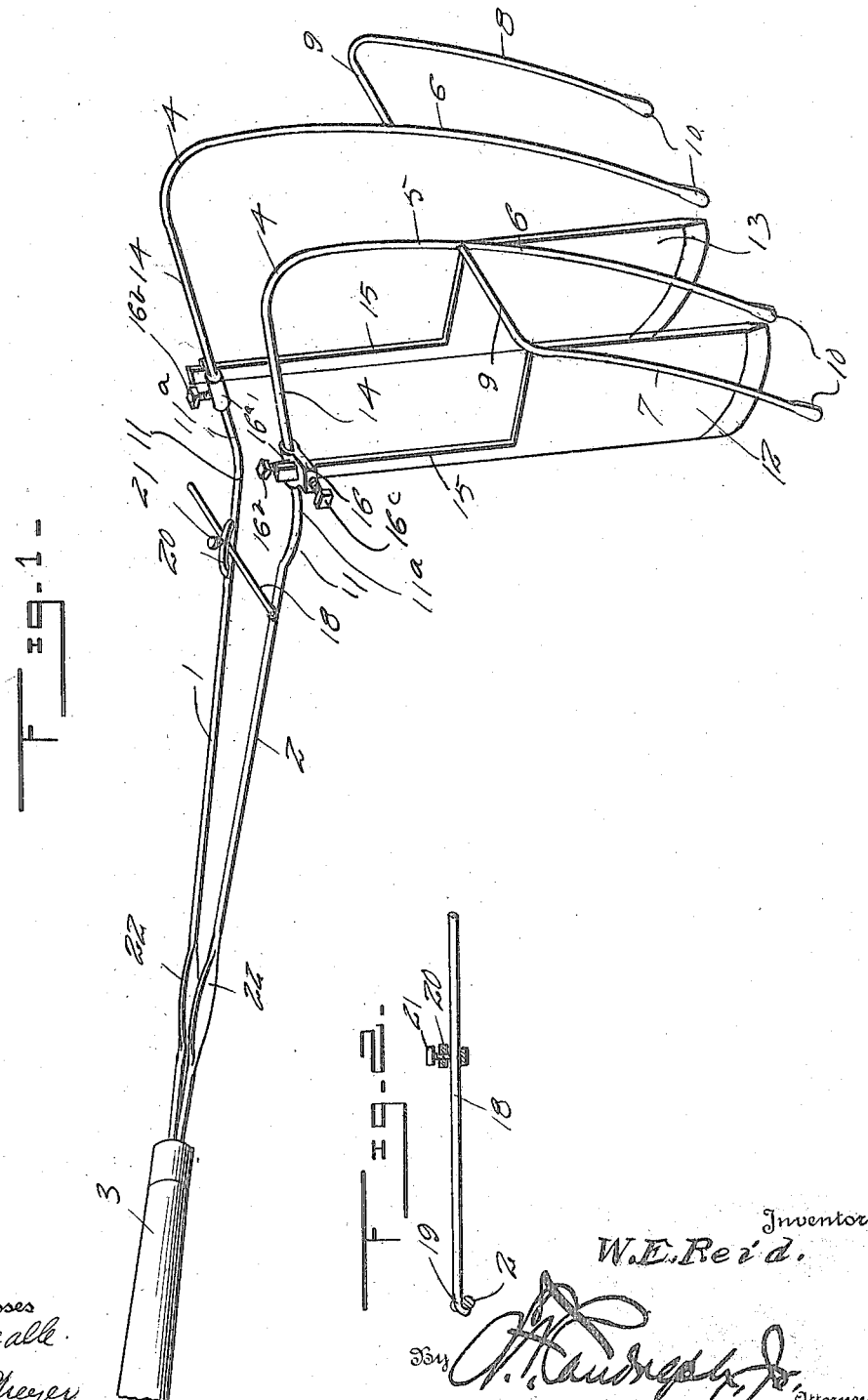
Witnesses
C. A. Beall.
Rohe Meyer.
Inventor
W. E. Reid.
By
Attorney

UNITED STATES PATENT OFFICE.

WILLIAM E. REID, OF STELLA, MISSOURI.

HAND-CULTIVATOR.

1,248,914.

Specification of Letters Patent.

Patented Dec. 4, 1917.

Application filed July 27, 1917. Serial No. 183,108.

*To all whom it may concern:*

Be it known that I, WILLIAM E. REID, a citizen of the United States, residing at Stella, in the county of Newton and State of Missouri, have invented certain new and useful Improvements in Hand-Cultivators; and I do hereby declare the following to be a full, clear, and exact description of the invention, such as will enable others skilled in the art to which it appertains to make and use the same.

This invention relates to a manually operated cultivator or garden tool and the primary object of the invention is to provide a manually operated cultivator which includes a plurality of cutting tines having knives positioned between the facing sides of the center pair of tines for cutting along a row of young plants, such as onions which are grown from seeds, beets, radishes or the like to permit of the efficient cultivation of the ground without in any way disturbing the plants.

Another object of this invention is to provide a tool as specified, which includes a pair of rods, each having a pair of tines formed upon their forward down turned ends and to adjustably mount a pair of knives upon the rods which are positioned between the innermost tines formed upon each rod so as to cut a groove along each side of a row of growing plants, which blades are further shaped to form fenders to prevent the tines from throwing clods of dirt upon the plants during the cultivation.

A further object of this invention is to provide means for holding the bars in various adjusted lateral positions for regulating the distance between the blades and the innermost tines, and also to increase the width and decrease the thickness of the rods adjacent to the handle thereof, so that the spring occasioned by the lateral adjustment of the rods will be applied to the rods in close proximity to the handle.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which—

Figure 1 is a perspective view of the improved tool, and

Fig. 2 is a fragmentary section showing the bar for holding the rods in lateral adjusted position.

Referring more particularly to the drawings, 1 and 2 indicate the main body rods of the tool which have a handle 3 of the ordinary construction used on hoes or like tools mounted upon their converging ends. The bars 1 and 2 have their diverged ends bent downwardly as shown at 4 to form a pair of spaced tines 5 and 6. Laterally positioned tines 7 and 8 are carried by the tines 5 and 6 respectively and connected thereto by horizontal straight portions 9, for properly spacing the tines 7 and 8 from the tines 5 and 6. If it is so desired, the tines 5, 6, 7 and 8 may have their free ends enlarged and flattened to form cutting points as indicated at 10. The bars 1 and 2 are curved outwardly as shown at 11 so as to position their portions which are next to the tines 5 and 6 in lateral spaced parallel relation to each other, and they are provided with the usual hoe shank crook at $11^a$. Knife blades 12 and 13 are carried by the horizontal portions 14 of the bars 1 and 2 respectively and these knife blades have shanks 15 formed thereon, the upper ends of which extend slidably through the projection 16 which are formed upon collars $16^a$. The collars $16^a$ as are adjustably mounted upon the parallel portions 14 and are held in place thereon by set screws $16^b$. The shanks 15 are held in adjusted position within the plate 16 by set screws $16^c$ which engage the shanks and hold them in adjusted position for regulating the elevation of the cutting or fender blades 12 and 13 with respect to the parallel portions 14. The lower edges of the knives 12 and 13 are curved and sharpened so that they will present a curved surface for cutting through the ground along side the row of growing plants.

The knife blades are relatively large so as to form fenders for the plants and prevent clods or dirt loosened by the tines from being thrown upon the plants. The bar 2 has a rod 18 attached thereto as shown at 19 which rod extends transversely to the bars 1 and 2 and beneath a strap 20 which is carried by the bar 1. A set screw 21 extends through the strap 20 and engages the rod 18 for clamping the rod and holding the bars 1, 2, in adjusted lateral position with respect to each other for varying the distance between the cutting blades 12 and 13 as required by the different type of plants being cultivated.

The bars 1 and 2 are flattened in close proximity to the handle 3 as shown at 22, so that the spring necessary for the lateral adjustment of the bars will be administered to the bars in close proximity to the handle 3.

In reducing the invention to practice, certain minor features of construction, combination and arrangement of parts may necessitate alterations to which the patentee is entitled, provided such alterations are comprehended within the scope of what is claimed.

What is claimed is:—

1. In a hand cultivator, a pair of bars each having one of its ends bent downwardly to form a cultivator tine, the ends of said bars remote from said tines being converged, a handle mounted upon said converged ends, a pair of tines attached to and held in spaced relation to said down turned ends, and means for holding said bars in various laterally extended positions.

2. In a hand cultivator, a pair of bars each having one of its ends bent downwardly to form a cultivating tine, the ends of said bars remote from said tines converging, a handle mounted upon the converged ends of said bars, a tine attached to and spaced from and in parallel relation with each of the down turned ends, said bars having portions thereof in close proximity to said handle increased in width and decreased in thickness, a rod attached to one of said bars, a strap carried by the other bar, a set screw carried by said strap for engaging said rod for holding said bars in spaced lateral position.

3. In a hand cultivator, a pair of bars each having one of its ends bent downwardly to form a cultivating tine, the ends of said bars remote from said tines converging, a handle mounted upon the converged ends of said bars, a tine attached to and spaced from and in parallel relation with each of the down turned ends of said bars, said bars having portions thereof in close proximity to said handle increased in width and decreased in thickness, a rod attached to one of said bars, a strap carried by the other bar, a set screw carried by said strap for engaging said rod for holding said bars in spaced lateral position, and a pair of knife blades adjustably carried by said rods and positioned between the down turned ends of the rods.

4. In a hand cultivator, a pair of bars each having one of its ends bent downwardly to form a cultivating tine, the ends of said bars remote from said tines converging, a handle mounted upon the converged ends of said bars, a tine attached to and spaced from and in parallel relation with each of said down turned ends, said bars having portions thereof in close proximity to said handle increased in width and decreased in thickness, a rod attached to one of said bars, a strap carried by the other bar, a set screw carried by said strap for engaging said rod for holding said bars in spaced lateral position, a pair of knife blades adjustably carried by said rods and positioned between the down turned ends of the rods, said blades adjustably connected to said rods, and means for holding said blades in various adjusted positions.

5. In a hand cultivator, a pair of bars each having one of their ends bent downwardly to form a cultivating tine, the ends of said bars remote from said downwardly bent ends converging and having a handle connected thereto, means for holding said bars in adjusted lateral positions with respect to each other, said bars being weakened in close proximity to said handle so that the spring occasioned by the lateral adjustment of the bars will be administered to the bars in close proximity to said handle.

6. In a hand cultivator, a pair of bars each having one of their ends bent downwardly to form a cultivating tine, the ends of said bars remote from said tines converging and having a handle connected thereto, means for holding said bars in adjusted lateral positions with respect to each other, said bars being weakened in close proximity to said handle so that the spring occasioned by the lateral adjustment of the bars will be administered to the bars in close proximity to said handle, and a tine connected to and spaced outwardly from and in parallel relation with each of said down turned tine ends.

7. In a hand cultivator, a pair of bars, cultivating elements carried by said bars, the ends of said bars remote from said cultivatings elements converging, a handle mounted upon said converging ends, said bars being weakened in close proximity to said handle, so that the spring occasioned by lateral movement of the bars will be administered to the bars in close proximity to the handle, and means for holding said bars in various laterally adjusted positions.

In testimony whereof I affix my signature in presence of two witnesses.

WILLIAM E. REID.

Witnesses:
J. C. G. LENTZ,
D. R. HODGE.

Copies of this patent may be obtained for five cents each, by addressing the "Commissioner of Patents, Washington, D. C."